(12) United States Patent
Na et al.

(10) Patent No.: US 9,961,184 B2
(45) Date of Patent: May 1, 2018

(54) CASE OF PORTABLE TERMINAL AND METHOD FOR CONTROLLING SMART KEY OF PORTABLE TERMINAL

(71) Applicant: Samsung Electronics Co., Ltd., Gyeonggi-do (KR)

(72) Inventors: Ga-Young Na, Gyeonggi-do (KR); Heon-Tak Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/001,314

(22) Filed: Jan. 20, 2016

(65) Prior Publication Data

US 2016/0227013 A1 Aug. 4, 2016

(30) Foreign Application Priority Data

Feb. 3, 2015 (KR) ........................ 10-2015-0016723

(51) Int. Cl.
*H04M 1/725* (2006.01)
*G07C 9/00* (2006.01)
*H04B 1/3888* (2015.01)
*H04M 1/02* (2006.01)
*H04M 1/60* (2006.01)
*H04W 88/06* (2009.01)

(52) U.S. Cl.
CPC ...... *H04M 1/7253* (2013.01); *G07C 9/00309* (2013.01); *G07C 9/00944* (2013.01); *H04B 1/3888* (2013.01); *H04M 1/0254* (2013.01); *H04M 1/6075* (2013.01); *H04M 1/72527* (2013.01); *H04M 1/72533* (2013.01); *H04M 2250/02* (2013.01); *H04W 88/06* (2013.01)

(58) Field of Classification Search
CPC ........... H04M 1/0254; H04M 1/72527; H04M 1/6075; H04M 2250/02; H04W 88/06
USPC ........ 455/418–420, 556.1, 557, 575.1, 575.8
See application file for complete search history.

(56) References Cited

U.S. PATENT DOCUMENTS

| 7,245,997 | B2 * | 7/2007 | Kitao | ...................... B60R 25/00 340/426.13 |
|---|---|---|---|---|
| 2006/0255911 | A1 * | 11/2006 | Taki | ........................ B60R 25/24 340/5.72 |
| 2008/0258868 | A1 * | 10/2008 | Nakajima | ............... B60R 25/24 340/5.72 |

(Continued)

FOREIGN PATENT DOCUMENTS

| JP | 2012-100227 A | 5/2012 |
|---|---|---|
| KR | 10-2014-0010676 A | 1/2014 |

*Primary Examiner* — Vladimir Magloire
*Assistant Examiner* — Jaime Holliday
(74) *Attorney, Agent, or Firm* — Cha & Reiter, LLC (57) ABSTRACT

A portable terminal case and a method for controlling a smart key of a portable terminal are provided. The portable terminal case may include a cover unit for covering and protecting a rear side of a portable terminal and a coupling unit for connecting with a connector exposed on a rear side of the portable terminal. A seating surface for receiving a smart key may be formed in an inner side of the cover unit and the coupling unit may include a communication port for communicating with the portable terminal and a power port for receiving power, which are electrically connected to the smart key received in the seating surface.

19 Claims, 9 Drawing Sheets

(56) References Cited

U.S. PATENT DOCUMENTS

| | | | |
|---|---|---|---|
| 2013/0141212 A1* | 6/2013 | Pickering | G05B 1/01 340/5.61 |
| 2014/0256304 A1* | 9/2014 | Frye | H04W 4/046 455/418 |
| 2016/0012653 A1* | 1/2016 | Soroko | G07C 9/00007 340/5.61 |

* cited by examiner

CASE OF PORTABLE TERMINAL AND METHOD FOR CONTROLLING SMART KEY OF PORTABLE TERMINAL

CLAIM OF PRIORITY

The present application claims the benefit under 35 U.S.C. § 119(a) to a Korean patent application filed in the Korean Intellectual Property Office on Feb. 3, 2015, and assigned Ser. No. 10-2015-0016723, the entire disclosure of which is hereby incorporated by reference.

TECHNICAL FIELD

The present disclosure relates generally to a portable terminal case and a method for controlling a smart key of a portable terminal.

BACKGROUND

Typically, a user can start an engine of his/her vehicle in person by inserting a car key into a key hole of a key assembly on a side of a front steering wheel of a driver's seat and then twisting the car key.

Recently, users carrying various card-type smart keys can remotely start the vehicle engine by pressing a key button of the smart key. In addition, smart keys can also remotely open or close a vehicle door or a trunk of the vehicle.

Disadvantageously, since the smart key conventionally only includes only key buttons and lacks a display, the user cannot control the vehicle by visually checking a vehicle control state as no visual indication is provided by the smart key. Moreover, while a great number of users carry a portable terminal such as a smart phone or a tablet Personal Computer (PC) all the time such portable terminals do not provide the functionality of the smart key resulting in the user having to carry the smart key separately from the portable terminal.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to provide a portable terminal case and a method for controlling a smart key of a portable terminal so that a user can easily carry the portable terminal and the smart key, thereby enhancing the functionality and convenience of each through the efficient interworking between the portable terminal and the smart key.

According to one aspect of the present disclosure, a portable terminal case may include a cover unit for covering and protecting a rear side of a portable terminal, and a coupling unit for connecting with a connector exposed on a rear side of the portable terminal. A seating surface for receiving a smart key may be formed in an inner side of the cover unit. A coupling unit may include a communication port for communicating with the portable terminal and a power port for receiving power may be electrically connected to the smart key received in the seating surface.

According to another aspect of the present disclosure, a method for controlling a smart key of a portable terminal may include: when coupling with a portable terminal case, supplying, at the portable terminal, power to the smart key of the portable terminal case; executing, at the portable terminal, a remote control application of a particular vehicle by communicating with the smart key; and receiving, at the portable terminal, unique information for the remote control of the particular vehicle from the smart key, and identifying and remotely controlling the particular vehicle.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

Figure 1:
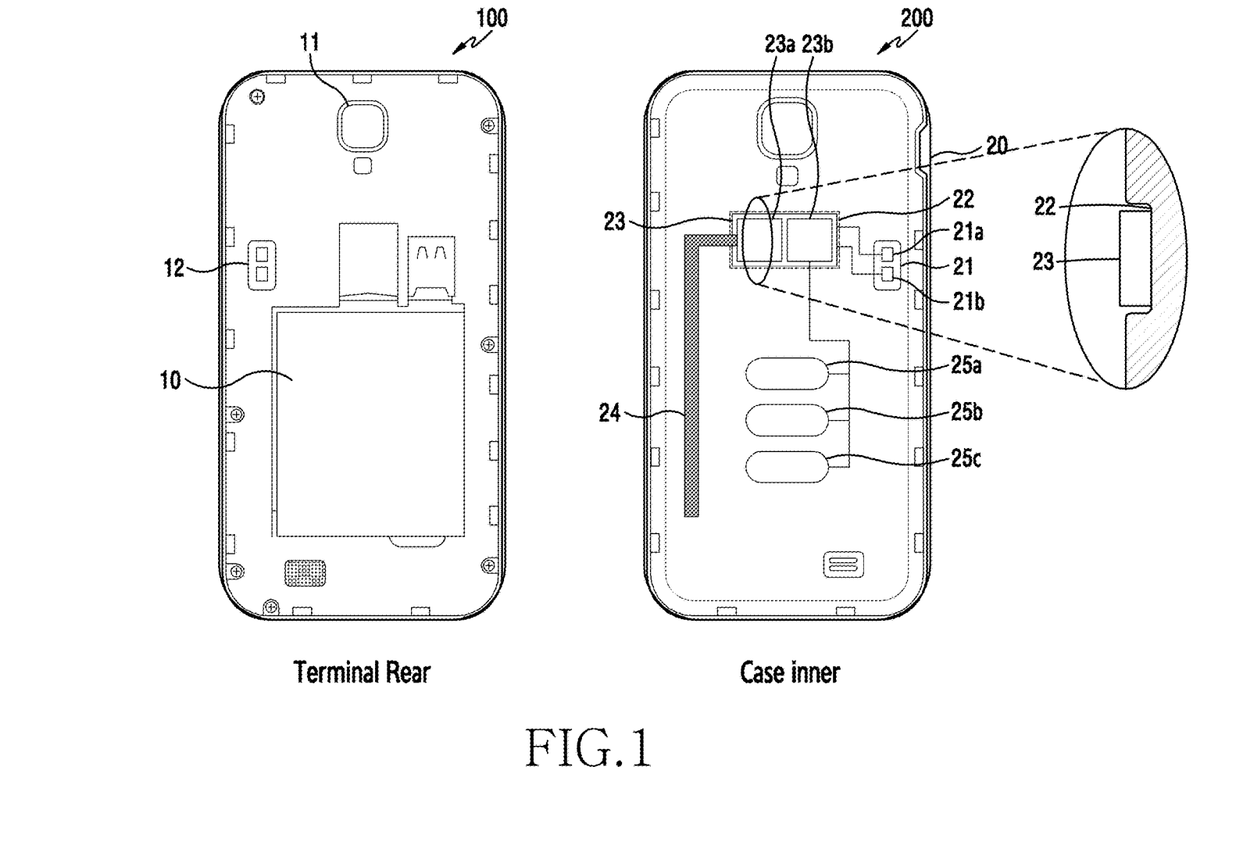
FIG. 1 is a diagram of a rear side of a portable terminal and an inner side of a portable terminal case according to an embodiment of the present disclosure.

FIG. 1 depicts a rear side of a portable terminal 100 and an inner side of a portable terminal case 200 according to an embodiment of the present disclosure. Referring to FIG. 1, the portable terminal 100, which may be one of various electronic devices including, for example, a smart phone. The rear side of the portable terminal 100 may expose a battery 10, a camera 11, and/or a connector 12 to outside prior to being coupled to a portable terminal case 200.

The portable terminal case 200 is a protective case for protecting the portable terminal 100. The portable terminal case 200 may be formed by various materials, including for example, a plastic material or metallic material. As shown in FIG. 1, the portable terminal case 200 may include cover unit 20 for covering and protecting the rear side of the portable terminal 100, and a coupling unit 21 for coupling with the connector 12 exposed on the rear side of the portable terminal 100.

The inner side of the cover unit 20 may include a seating surface 22 for receiving the smart key 23. The coupling unit 21 may include a communication port 21*a* and a power port 21*b*, which may be electrically connected to the smart key 23 received in the seating surface 22 such that the smart key 23 may communicate with the portable terminal 100 and also receive power via respective ones of the communication port 21*a* and the power port 21*b*.

The smart key 23 may include a communication module 23*a* such as a Radio Frequency Integrated Circuit (RFIC) for wirelessly communicating with the vehicle, and a controller 23*b* for interfacing with the portable terminal 100. The cover unit 20 may include an antenna 24 allowing the communication module 23*a* to wirelessly communicate directly with the vehicle.

The smart key 23 can receive the power from the portable terminal 100 through the power port 21*b* of the coupling unit 21, and communicate with the portable terminal 100 through the communication port 21*a* of the coupling unit 21. The smart key 23 can be formed using a card-type Printed Circuit Board (PCB) including the RFIC.

The smart key 23 may be received in the seating surface 22 and secured therein using one or more of a tape and/or a screw. The seating surface 22 can be a space engraved or formed inside the cover unit 20 so as to receive the smart key 23. The smart key 23 received in the seating surface 22 may be electrically connected to the communication port 21*a* and the power port 21*b* of the coupling unit 21 via a flexible PCB.

Figure 2:
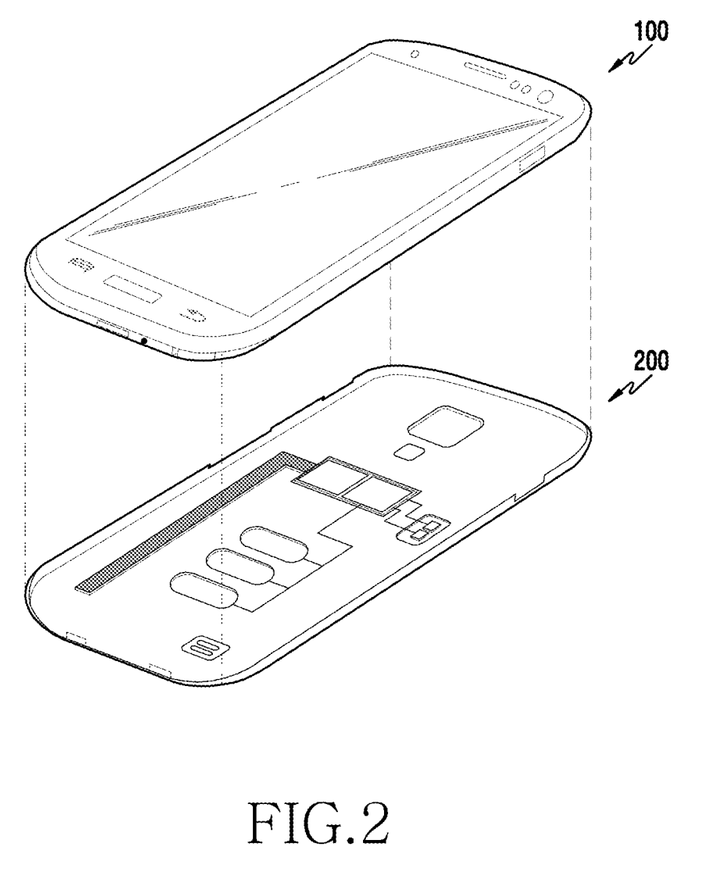
FIG. 2 is a diagram of a portable terminal and a portable terminal case coupled according to an embodiment of the present disclosure.
Figure 3:
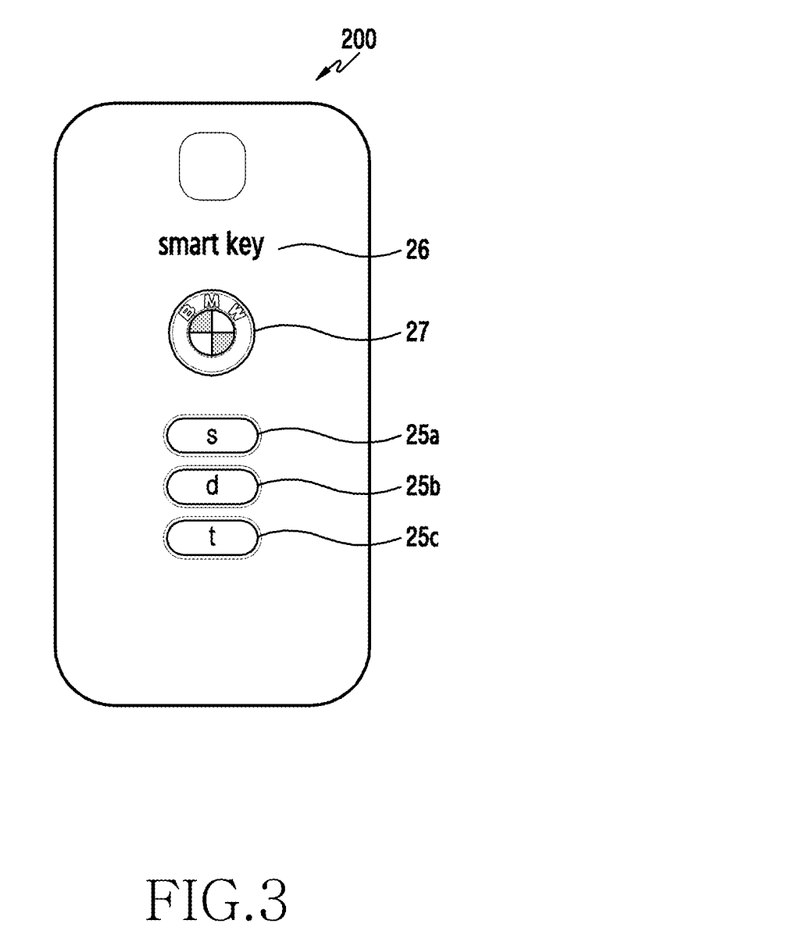
FIG. 3 is a diagram of a rear side of a portable terminal case according to an embodiment of the present disclosure.

FIG. 2 depicts a portable terminal 100 and a portable terminal case 200 coupled to one another according to an embodiment of the present disclosure, and FIG. 3 depicts a rear side of a portable terminal case 200 according to an embodiment of the present disclosure.

Referring to FIG. 2, the portable terminal case 200 may be coupled with the portable terminal 100 in the same manner as a typical portable terminal protective case. Referring to FIG. 3, on a rear side of the portable terminal case 200, a text 26 indicating the portable terminal case with smart key control functionality and a logo 27 indicating a particular vehicle type can be attached or printed.

The rear side of the portable terminal case 200 may include one or more buttons, which may be virtual buttons or physical buttons. For example, the portable terminal case 200 may include physical buttons provided by exposing one or more hardware key buttons 25*a*, 25*b*, and 25*c* through the case 200. For example, the rear side of the case 200 may expose the ignition key 25*a* for remotely starting a vehicle engine, the door key 25*b* for opening and closing a vehicle door, and a trunk key 25*c* for opening and closing a vehicle trunk. Other keys may provide different functionality.

When a user presses the hardware key button 25*a*, 25*b*, and 25*c*, the smart key 23 can remotely control the vehicle as the user wishes in one of the following ways (a) without interworking with the portable terminal 100 by wirelessly sending a corresponding vehicle control signal, or (b) by interworking with the portable terminal 100 to send a control signal to the vehicle.

When directly sending the radio control signal for the vehicle remote control and then receiving a response signal from the vehicle, the smart key 23 forwards the response signal to the portable terminal 100. The portable terminal 100 receiving the response signal can display a vehicle control state on a user interface screen (e.g., a display screen) based on the response signal.

Figure 4:
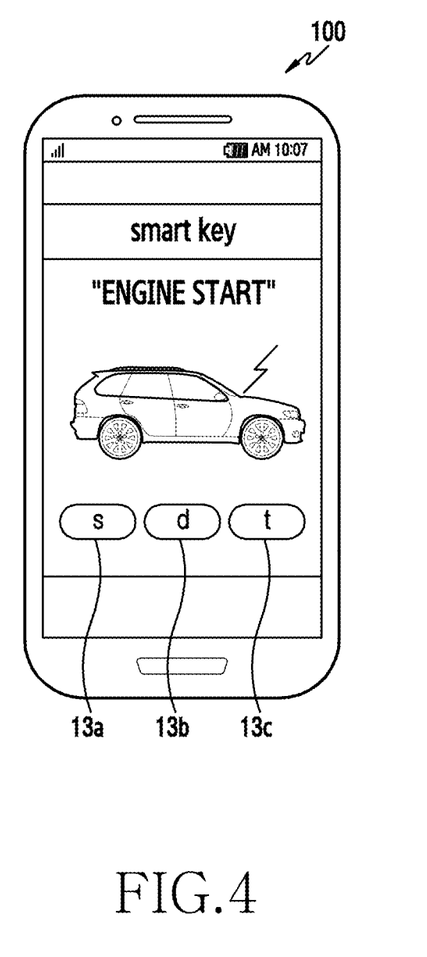
FIG. 4 is a diagram of a screen displaying smart key control in a portable terminal according to an embodiment of the present disclosure.

FIG. 4 depicts a screen displaying smart key control in a portable terminal 100 according to an embodiment of the present disclosure. Referring to FIG. 4, the display screen of the portable terminal 100 can notify a smart key control mode for the vehicle control and display one or more software key buttons 13*a*, 13*b*, and 13*c* so that the user can select his/her intended remote control button.

For example, the portable terminal 100 can display, on a display screen of the terminal 100, the software key buttons corresponding to the functions provided by keys 13*a*-*c* including the ignition key 13*a* for remotely starting the vehicle engine, the door key 13*b* for opening and closing a vehicle door, and the trunk key 13*c* for opening and closing a vehicle trunk.

The portable terminal 100 can wirelessly send a vehicle remote control signal through the smart key 23 received in the portable terminal case 200 as shown in FIG. 1, or through various communication modules of the portable terminal 100.

According to the control signal, the portable terminal 100 can receive the response signal from the vehicle through the smart key 23 or through the communication module of the portable terminal 100. Based on the response signal, the portable terminal 100 can display a vehicle control state on the display screen.

Figure 5:
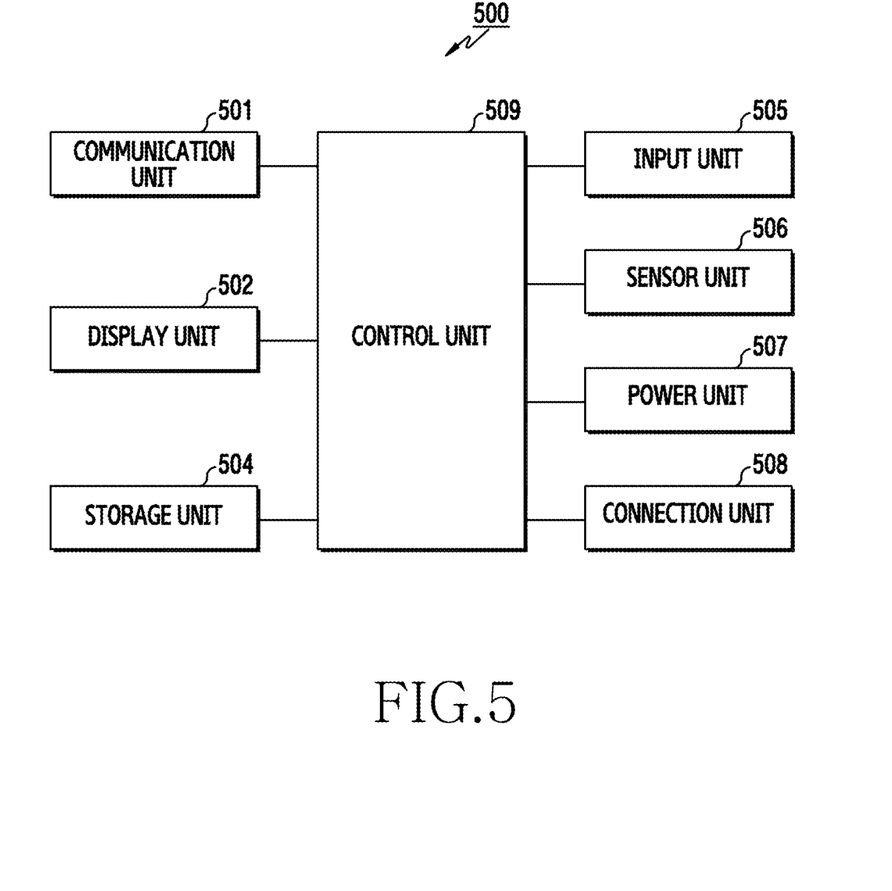
FIG. 5 is a block diagram of a portable terminal according to an embodiment of the present disclosure.

FIG. 5 is a block diagram of a portable terminal 500 according to an embodiment of the present disclosure. Referring to FIG. 5, the portable terminal 500 may include, for example, various electronic devices such as a smart phone or a tablet Personal Computer (PC).

The portable terminal may can include a communication unit 501 for the wireless communication, a display unit 502 for displaying the display screen, a storage unit 504 for storing data and information, an input unit 505 for receiving a user key, a sensor unit 506 including various sensors, and a power unit 507 for supplying the power.

The portable terminal 500 may include a connection unit 508 for electrically connecting to the portable terminal case 200, and a control unit 509. The connection unit 508 may include the connector 12 including the communication port for communicating with the smart key 23 received in the portable terminal case 200 and the power port for supplying the power to the smart key 23 as stated earlier in FIG. 1. The control unit 509 may control various components. For example, the control unit 509 may remotely control the vehicle by communicating with the smart key 23.

Figure 6:
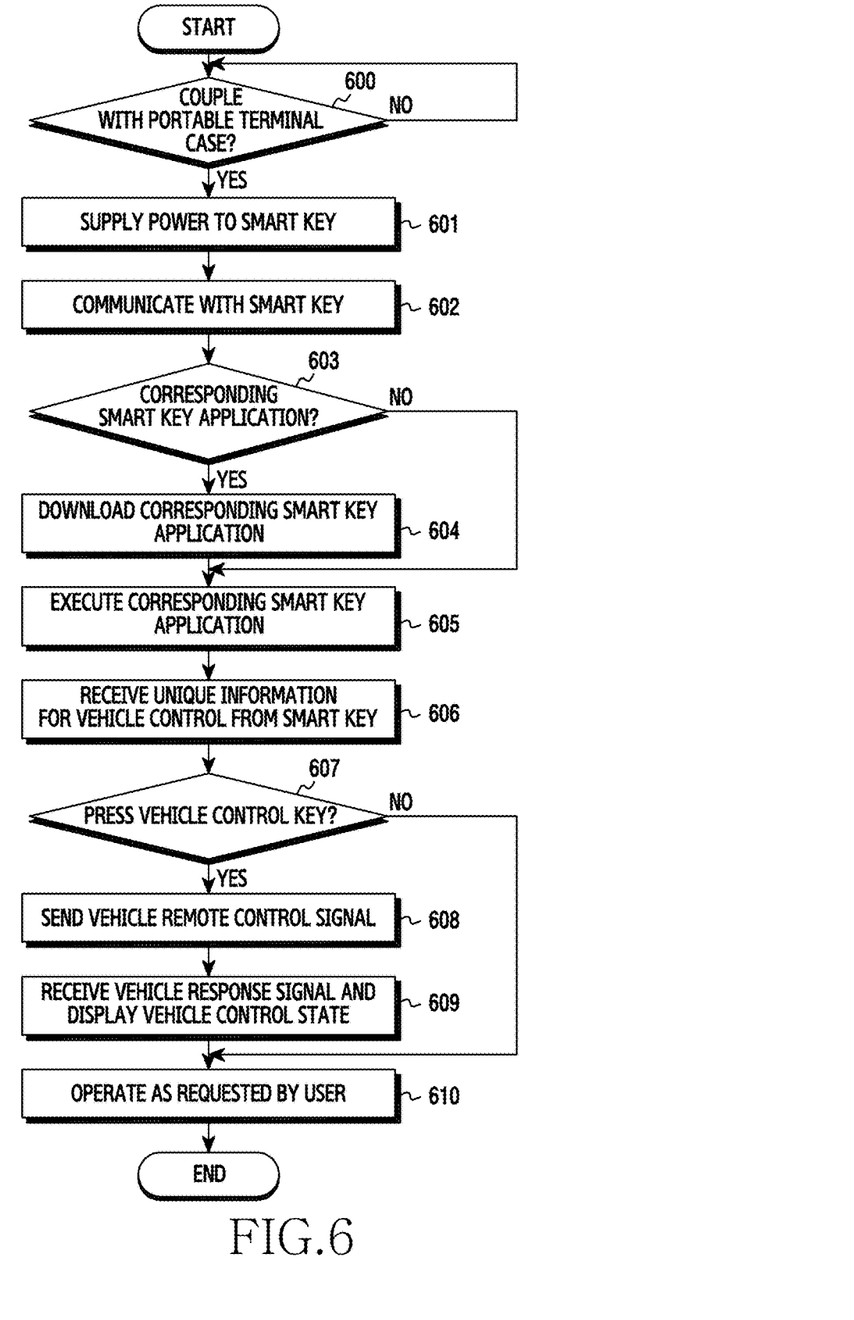
FIG. 6 is a flowchart of a smart key control method of a portable terminal according to an embodiment of the present disclosure.

FIG. 6 is a flowchart of a smart key control method of a portable terminal 500 according to an embodiment of the present disclosure. Referring to FIG. 6, the control unit 509 of the portable terminal 500 may detect whether the portable terminal case 100 is coupled in operation 600.

For example, when an impedance value of the power port or the communication port of the connector which is the connection unit 508 of the portable terminal 500 changes due to the coupling with the portable terminal case 200, the control unit 509 can determine that the portable terminal case 200 is engaged.

When detecting the coupling with the portable terminal case 200, the control unit 509 controls the power unit 507 to supply the power to the smart key 23 of the portable terminal case 200 in operation 601. In operation 602, the control unit 509 may communicate with the smart key 23 of the portable terminal case 200.

For example, when the smart key 23 is a valid smart key conforming to a preset communication protocol for the vehicle remote control based on the communication with the smart key 23, the control unit 509 may determine whether the storage unit 504 of the portable terminal 500 stores a corresponding smart key application in operation 603.

When detecting no corresponding smart key application in the storage unit 507, the control unit 509 may download the corresponding smart key application from the smart key 23 or an Internet server in operation 604 and store the downloaded smart key application in the storage unit 504. Herein, access information (e.g., Uniform Resource Locator (URL)) of the Internet server can be provided from the smart key 23.

The control unit 509 may execute the corresponding smart key application downloaded or stored in the storage unit 507 in operation 605, and may receive unique information for particular vehicle remote control from the smart key 23 in operation 606.

The unique information may include vehicle identification information (e.g., a vehicle manufacturer, a vehicle type, a vehicle manufacture number, and the like) assigned to the particular vehicle and vehicle control information (e.g., a vehicle remote control code value) assigned for the particular vehicle remote control.

Instead of the control unit 509, the ongoing smart key application can receive the unique information from the smart key 23. The unique information can be stored in the storage unit 504 and updated periodically or intermittently.

When storing the unique information in the storage unit 504 and receiving a user's key input for the vehicle control in operation 607, the control unit 509 may generate a vehicle remote control signal corresponding to the user's key input based on the user's input key and the unique information stored in the storage 504 and then send the generated vehicle remote control signal to the particular vehicle in operation 608.

When the user selects a key corresponding to the engine ignition, the control unit 509 may search the unique information stored in the storage unit 504 for a vehicle remote control code value corresponding to the engine ignition and then send a corresponding RF signal to the particular vehicle.

The RF signal can be transmitted through the communication unit 501 (e.g., an RF module) of the portable terminal 500 or the communication module 23a (e.g., the RF IC) of the smart key 23 of the portable terminal case 200.

In operation 609, the control unit 509 may receive a vehicle response signal from the vehicle and display a current vehicle control state based on the vehicle response signal.

For example, the control unit 509 can control the display unit 502 to display various graphical user interface screens such as an animation of the started vehicle engine. In operation 610, the control unit 509 may perform an operation (e.g., stop the engine) requested by the user.

Figure 7:
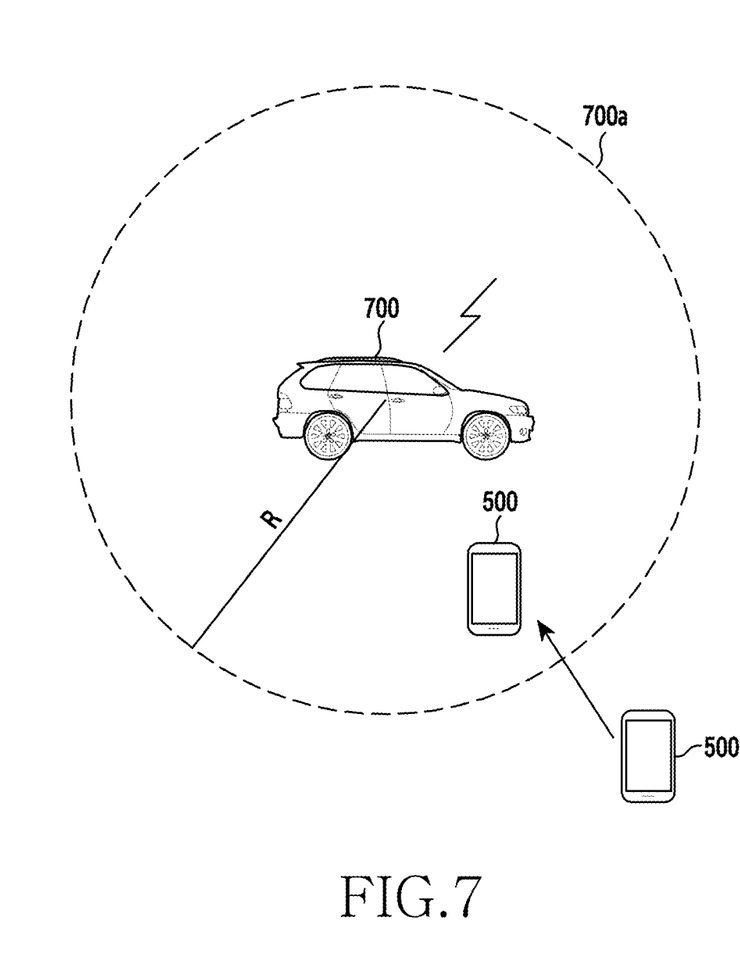
FIG. 7 is a diagram of a portable terminal approaching a wireless communication range of a particular vehicle according to an embodiment of the present disclosure.

FIG. 7 depicts a portable terminal 500 approaching a wireless communication range of a particular vehicle 700 according to an embodiment of the present disclosure. When the user carrying the portable terminal 500, such as a smart phone, including the portable terminal case 200 approaches his/her vehicle 700, the user may obtain a proximity state to the vehicle 700 through the portable terminal 500.

Referring to FIG. 7, the smart key 23 received in the portable terminal case 200 may wirelessly communicate with the vehicle 70 on a periodic or intermittent basis. Thus, the smart key 23 may detect a signal strength received from the vehicle 700 and calculate a distance from the vehicle 700 to the smart key 23.

For example, the smart key 23 may divide the distance from the vehicle 700 into a plurality of levels based on the received signal strength from the vehicle 700. When detecting a preset reference signal strength value, the smart key 23 may determine its location within an effective range for wirelessly communicating directly with the vehicle 700.

Figure 8:
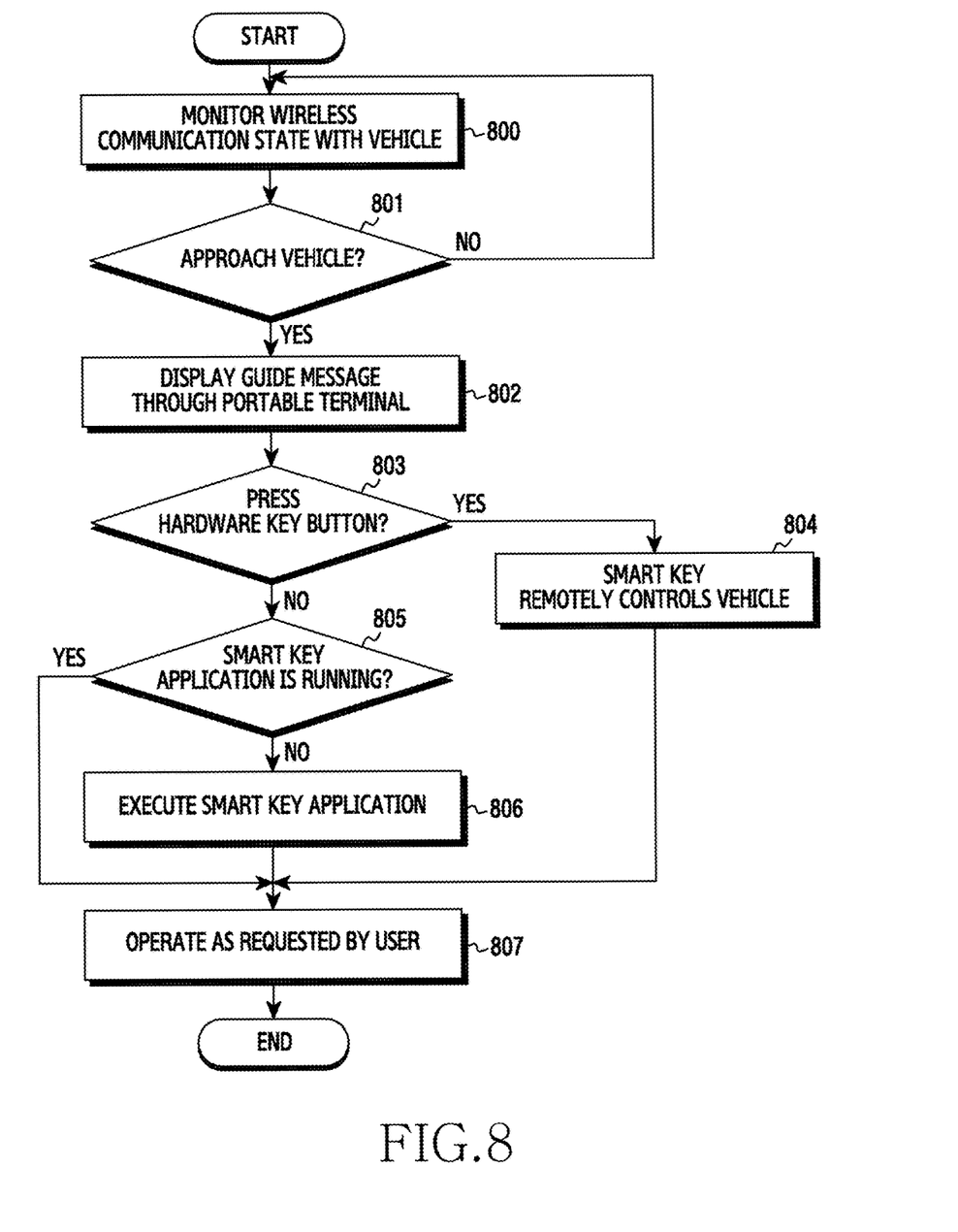
FIG. 8 is another flowchart of a smart key control method of a portable terminal according to an embodiment of the present disclosure.
Figure 9:
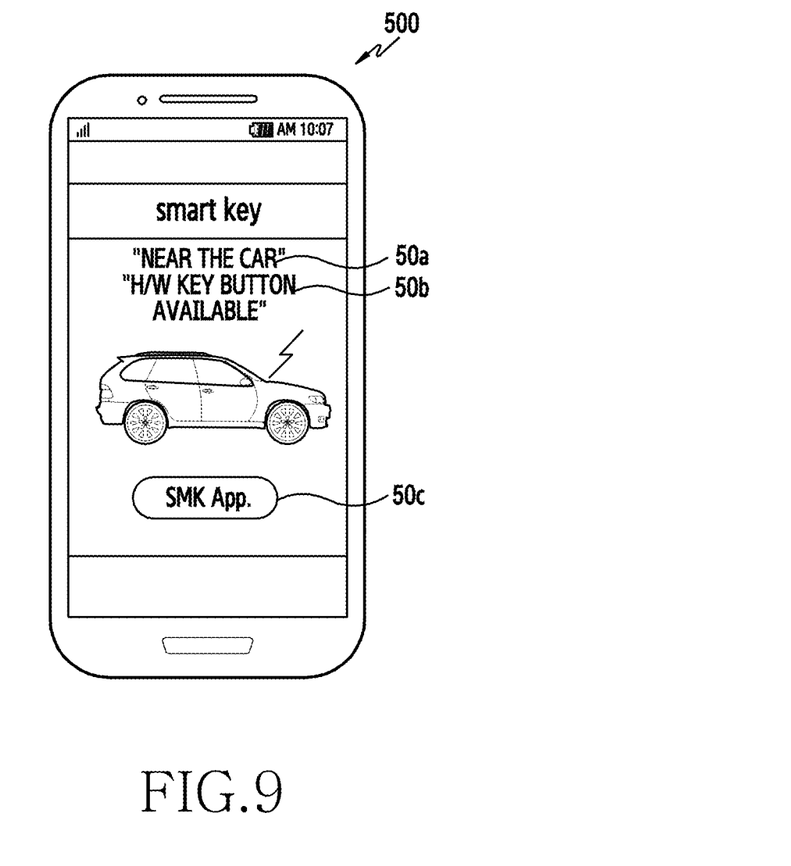
FIG. 9 is another diagram of a screen displaying smart key control in a portable terminal according to an embodiment of the present disclosure.

FIG. 8 is another flowchart of a smart key control method of a portable terminal 500 according to an embodiment of the present disclosure, and FIG. 9 is another diagram of a screen displaying smart key control in a portable terminal 500 according to an embodiment of the present disclosure.

Referring to FIG. 8, in operation 800, the smart key 23 of the portable terminal case 200 may periodically or intermittently monitor the wireless communication state with the particular vehicle 700. In operation 801, the smart key 23 may determine whether it approaches or comes near the vehicle 700 by monitoring the wireless communication state.

For example, when a radio signal strength received from the vehicle 700 is a preset reference signal strength value, the smart key 23 can determine its location in the direct wireless communication range with the vehicle 700.

Near the vehicle 700, the smart key 23 can communicate with the control unit 509 of the portable terminal 500 to display a message guiding the current state through the portable terminal 500 in operation 802.

Referring to FIG. 9, the guide message displayed through the portable terminal 500 may include: (a) a message 50a (e.g., "near the car") indicating the proximity to the vehicle; (b) a message 50b (e.g., "H/W key button available") indicating the vehicle remote controllable by directly pressing the hardware key buttons exposed on the rear side of the portable terminal case, and/or (c) a select button 50c for executing a smart key remote control application.

When the user presses one of the hardware key buttons 25a, 25b, and 25c exposed on the rear side of the portable terminal case 200 in operation 803, the smart key 23 can remotely control the vehicle 700 by sending a control signal corresponding to the pressed hardware key button in operation 804. Herein, the smart key 23 may independently fulfill or execute the vehicle remote control without interworking with the portable terminal 500.

In operation 805, the control unit 509 of the portable terminal 500 determines whether the smart key application is running. When the smart key application is not running, the control unit 509 may retrieve and execute the smart key application stored in the storage unit 504 in operation 806.

Whether the smart key application is running can be determined automatically by the control unit 509, or manually based on the pressing of the select button (e.g., SMK App) 50c of FIG. 9.

In operation 807, the control unit 509 or the smart key 23 may remotely control the vehicle as requested by the user. Herein, the smart key 23 may directly control the vehicle 700 by wirelessly communication with the vehicle 700 without interworking with the portable terminal 500 or may control the vehicle 700 by interworking with the portable terminal 500.

As set forth above, the user can carry the portable terminal and the smart key more easily, and intuitively and easily achieve the vehicle remote control using the efficient interworking between the portable terminal and the smart key.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for controlling a smart key of a portable terminal, comprising:
   in response to detecting coupling with a portable terminal case, supplying, at the portable terminal, power to the smart key included in the portable terminal case having a hardware key button for controlling a vehicle;
   determining, at the portable terminal, whether a strength of a signal received from the vehicle is equal to a preset reference signal strength or above the preset reference signal strength by communicating with the smart key;
   in response to determining that the strength of the signal received from the vehicle is equal to the preset reference signal strength or above the preset reference signal strength, displaying, at the portable terminal, a first guide message and a second guide message on a screen of the portable terminal;
   receiving, at the portable terminal, unique information for controlling of the vehicle from the smart key;
   in response to detecting a user input at the hardware key button, remotely controlling the vehicle based on the unique information through the hardware key button;
   in response to determining that the user input is not detected at the hardware key button, determining whether a remote control application for controlling the vehicle is being executed at the portable terminal by communicating with the smart key;
   in response to determining that the remote control application for controlling the vehicle is not being executed by communicating with the smart key, executing the remote control application for controlling the vehicle by communicating with the smart key,
   in response to detecting a user input at the remote control application, remotely controlling the vehicle based on the unique information through the remote control application,
   wherein the first guide message indicates that the hardware key button is usable for controlling the vehicle remotely, and
   wherein the second guide message indicates that the remote control application of the vehicle is usable for controlling the vehicle remotely.

2. The method of claim 1, wherein the unique information comprises one or more of vehicle identification information assigned to the vehicle and vehicle control information assigned for the remote control of the vehicle.

3. The method of claim 1, wherein, when wirelessly communicating with the vehicle and detecting the vehicle within a preset reference distance, the smart key automatically executes the remote control application through an interface with the portable terminal.

4. The method of claim 2, further comprising:
   when the remote control application is automatically executed, displaying, at the portable terminal, a current state of the vehicle on a user interface screen.

5. The method of claim 4, wherein the user interface screen comprises the current state of the vehicle and one or more software key buttons for remotely controlling the vehicle.

6. The method of claim 1, further comprising:
   when wirelessly communicating with the vehicle and not detecting the vehicle within a preset reference distance, automatically aborting, at the smart key, the remote control application through an interface with the portable terminal.

7. The method of claim 1, further comprising:
   wirelessly sending a vehicle control signal directly without interworking with the portable terminal.

8. The method of claim 1, further comprising:
   after wirelessly sending a vehicle control signal directly, when receiving a response signal from the vehicle, forwarding, at the smart key, the response signal to the portable terminal.

9. The method of claim 8, further comprising:
   when receiving the response signal, displaying, at the portable terminal, a vehicle control state on a screen based on the response signal.

10. A non-transitory computer-readable storage medium storing one or more programs comprising instructions which, when executed by an electronic device, cause the device to execute a plurality of operations, wherein the plurality of operation comprise:
    in response to detecting coupling with a electronic device case, supplying, at the electronic device, power to a smart key included in the electronic device case having a hardware key button for controlling a vehicle;
    determining, at the electronic device, whether a strength of a signal received from the vehicle is equal to a preset reference signal strength or above the preset reference signal strength by communicating with the smart key;
    in response to determining that the strength of the signal received from the vehicle is equal to the preset reference signal strength or above the preset reference signal strength, displaying, at the electronic device, a first guide message and a second guide message on a screen of the electronic device;
    receiving, at the electronic device, unique information for controlling of the vehicle from the smart key;
    in response to detecting a user input at the hardware key button, remotely controlling the vehicle based on the unique information through the hardware key button;
    in response to determining that the user input is not detected at the hardware key button, determining whether a remote control application for controlling the vehicle is being executed at the electronic device by communicating with the smart key;
    in response to determining that the remote control application for controlling the vehicle is not being executed at the electronic device by communicating with the smart key, executing the remote control application for controlling the vehicle by communicating with the smart key,
    in response to detecting a user input at the remote control application, remotely controlling the vehicle based on the unique information through the remote control application,
    wherein the first guide message indicates that the hardware key button is usable for controlling the vehicle remotely, and
    wherein the second guide message indicates that the remote control application of the vehicle is usable for controlling the vehicle remotely.

11. A portable terminal coupled to a smart key, comprising:
    a communication module configured to communicate with the smart key;

display; and a processor configured to:

in response to detecting coupling with a portable terminal case, supply, at the portable terminal, power to the smart key included in the portable terminal case having a hardware key button for controlling a vehicle;

determine, at the portable terminal, whether a strength of a signal received from the vehicle is equal to a preset reference signal strength or above the preset reference signal strength by communicating with the smart key;

in response to determining that the strength of the signal received from the vehicle is equal to the preset reference signal strength or above the preset reference signal strength, display, at the portable terminal, a first guide message and a second guide message on a screen of the portable terminal;

receive, at the portable terminal, unique information for controlling the vehicle from the smart key;

in response to detecting a user input at the hardware key button, remotely control the vehicle based on the unique information through the hardware key button;

in response to determining that the user input is not detected at the hardware key button, determine whether a remote control application for controlling the vehicle is being executed at the portable terminal by communicating with the smart key;

in response to determining that the remote control application for controlling the vehicle is not being executed at the portable terminal by communicating with the smart key, execute the remote control application for controlling the vehicle by communicating with the smart key, in response to detecting a user input at the remote control application, remotely control the vehicle based on the unique information through the remote control application, wherein the first guide message indicates that the hardware key button is usable for controlling the vehicle remotely, and wherein the second guide message indicates that the remote control application of the vehicle is usable for controlling the vehicle remotely.

12. The portable terminal of claim 11, wherein the unique information comprises one or more of vehicle identification information assigned to the vehicle and vehicle control information assigned for the remote control of the vehicle.

13. The portable terminal of claim 11, wherein, when wirelessly communicating with the vehicle and detecting the vehicle within a preset reference distance, the smart key automatically executes the remote control application through an interface with the portable terminal.

14. The portable terminal of claim 12, wherein the processor further configured to, when the remote control application is automatically executed, display, at the portable terminal, a current state of the vehicle on a user interface screen.

15. The portable terminal of claim 14, wherein the user interface screen comprises the current state of the vehicle and one or more software key buttons for remotely controlling the vehicle.

16. The portable terminal of claim 11, wherein the processor further configured to, when wirelessly communicating with the vehicle and not detecting the vehicle within a preset reference distance, automatically abort, at the smart key, the remote control application through an interface with the portable terminal.

17. The portable terminal of claim 11, wherein the smart key wirelessly sends a vehicle control signal directly without interworking with the portable terminal.

18. The portable terminal of claim 11, wherein the processor further configured to, after wirelessly sending a vehicle control signal directly, when receiving a response signal from the vehicle, forward, at the smart key, the response signal to the portable terminal.

19. The portable terminal of claim 18, wherein the processor further configured to, when receiving the response signal, display, at the portable terminal, a vehicle control state on a screen based on the response signal.

* * * * *